United States Patent
Boe et al.

(10) Patent No.: US 9,330,828 B2
(45) Date of Patent: May 3, 2016

(54) SUBSEA TRANSFORMER

(75) Inventors: Ove Boe, Tanem (NO); Espen Haugan, Trondheim (NO); Torbjoern Stroemsvik, Asker (NO)

(73) Assignee: Siemens Akiengesellschaft, München (DE)

( * ) Notice: Subject to any disclaimer, the term of this patent is extended or adjusted under 35 U.S.C. 154(b) by 76 days.

(21) Appl. No.: 14/345,612

(22) PCT Filed: Sep. 3, 2012

(86) PCT No.: PCT/EP2012/067143
§ 371 (c)(1),
(2), (4) Date: Oct. 27, 2014

(87) PCT Pub. No.: WO2013/041364
PCT Pub. Date: Mar. 28, 2013

(65) Prior Publication Data
US 2015/0077205 A1    Mar. 19, 2015

(30) Foreign Application Priority Data
Sep. 19, 2011 (EP) ..................................... 11181812

(51) Int. Cl.
| | |
|---|---|
| *H01F 27/02* | (2006.01) |
| *H01F 27/10* | (2006.01) |
| *E21B 33/038* | (2006.01) |
| *H01F 27/14* | (2006.01) |
| *E21B 41/00* | (2006.01) |
| *F16J 15/06* | (2006.01) |

(52) U.S. Cl.
CPC ............ *H01F 27/02* (2013.01); *E21B 33/0385* (2013.01); *E21B 41/0007* (2013.01); *F16J 15/06* (2013.01); *H01F 27/14* (2013.01)

(58) Field of Classification Search
CPC .......... H01F 27/02; H01F 27/14; F16J 15/06; E21B 41/0007; E21B 33/0385

USPC ....................... 336/58, 90, 94, 192
See application file for complete search history.

(56) References Cited

U.S. PATENT DOCUMENTS

| | | | | |
|---|---|---|---|---|
| 3,825,148 | A  * | 7/1974 | Hunter et al. .............. | 220/359.1 |
| 2004/0051615 | A1* | 3/2004 | Hafskjold et al. ............... | 336/57 |
| 2011/0203379 | A1* | 8/2011 | Virtanen et al. ................ | 73/708 |

FOREIGN PATENT DOCUMENTS

| | | |
|---|---|---|
| EP | 2169690 A1 | 3/2010 |
| GB | 1600095 A | 10/1981 |
| JP | 58-053810 A * | 3/1983 |
| WO | 0241336 A1 | 5/2002 |

OTHER PUBLICATIONS

Bernt Bjerkreim et al., "Ormen Lange Subsea Compression Pilot", Offshore Technology Conference No. OCT 18969, Apr. 30-May 3, 2007, 11 pages.
E. Virtanen et al., "Under Pressure: ABB's Subsea Transformers", Pathways to Innovation, ABB Review, XP007921106, Apr. 1, 2009, 3 pages.
European Search Report in corresponding European Patent Application No. 11181812 .6, dated Feb. 15, 2012.
Hans Gedde et al., "Ormen Lange Long Step-Out Power Supply", Offshore Technology Conference No. OTC 20042, May 4-7, 2009, 17 pages.
International Search Report and Written Opinion in corresponding PCT Application No. PCT/EP2012/067143, dated Oct. 12, 2012.

* cited by examiner

*Primary Examiner* — Mangtin Lian
(74) *Attorney, Agent, or Firm* — Lempia Summerfield Katz LLC

(57) ABSTRACT

A subsea transformer that includes a transformer and a transformer tank adapted to accommodate the transformer is provided. The transformer tank has an opening that is sized so as to enable insertion of the transformer into the transformer tank through the opening. A closing plate is adapted to close the opening of the transformer tank. At least one component having a double barrier against ingress of an ambient medium surrounding the subsea transformer when installed subsea is mounted to the closing plate.

14 Claims, 4 Drawing Sheets

SUBSEA TRANSFORMER

The present patent document is a §371 nationalization of PCT Application Serial Number PCT/EP2012/067143, filed Sep. 3, 2012, designating the United States, which is hereby incorporated by reference. This patent document also claims the benefit of EP 11181812.6, filed on Sep. 19, 2011, which is also hereby incorporated by reference.

FIELD

The present embodiments relate to a subsea transformer including a transformer arranged inside a transformer tank.

BACKGROUND

Oil platforms may be used in offshore oil and gas production. More recently, processing facilities are being relocated to the ocean floor. Such subsea installations may use electric power to operate. Electric power may be produced subsea or may be transported to the subsea installation from a topside installation (e.g., via an umbilical from an oil platform or ship, or via a subsea cable from an onshore site). Higher voltages may be used for transporting electric energy from the topside installation to the subsea installation (e.g., to limit losses). Accordingly, a transformation to a lower voltage at which subsea equipment is to be operated is to be provided. A transformer may step up a voltage supplied by offshore power generating devices, such as wind turbines, for the transmission to an onshore site. For this purpose, a subsea transformer may be provided at a subsea installation.

The subsea installation may be located at a great water depth (e.g., more that 1000, more than 2000 or even more than 3000 meters deep). The high pressures that prevail at such depths of water may be dealt with by providing a pressure resistant enclosure for the transformer, the inside of which is kept at a close to atmospheric pressure. The problem with such enclosures is that the enclosures are very bulky and heavy, as the enclosures are to withstand pressure differences up to 300 bar.

To overcome such problems, the transformer may be provided in an enclosure that is pressure compensated (e.g., in which the inside pressure is equalized to the outside pressure). The pressure difference may thus be kept small, enabling the use of a lighter enclosure having thinner walls. Although this greatly facilitates the design of the enclosure, a number of problems remain.

To provide a safe operation of the transformer, the transformer enclosure is to be tightly sealed against the ambient sea water. For example, a proper sealing of the enclosure provides that providing pressure compensation may be difficult. The transformer is to be contacted electrically. The electric connections through the enclosure to the transformer are again difficult to seal.

Enclosed volumes that are additionally provided for sealing either are to be provided with thick walls that are capable of withstanding the high outside pressures, or also are to be pressure compensated. Accordingly, pressure compensation of the transformer enclosure is difficult to implement, the pressure compensation may be complex in configuration and may require a considerable amount of space, making the transformer enclosure bulkier. Further, due to the technical complexity, the pressure compensation may be cost intensive to implement. Each pressure compensation furthermore uses sealing that is a potential weak point regarding the watertightness of the subsea transformer enclosure.

Assembly of the subsea transformer is thus complex and time intensive. It is desirable to facilitate the assembly and to reduce the number of weak points in the sealing of the subsea transformer to prevent the ingress of surrounding sea water. A compact and cost efficient design of the subsea transformer is further desirable.

SUMMARY AND DESCRIPTION

There is a need for an improved subsea transformer, which, for example, provides good sealing while facilitating assembly thereof.

An embodiment provides a subsea transformer including a transformer and a transformer tank adapted to accommodate the transformer. The transformer tank has an opening that is sized so as to enable the insertion of the transformer into the transformer tank through the opening. The transformer is arranged inside the transformer tank. The subsea transformer further includes a closing plate adapted to close the opening of the transformer tank, and at least one component mounted to the closing plate and having a double barrier against the ingress of an ambient medium surrounding the subsea transformer when installed subsea, such as sea water. A fluid tight seal between the transformer tank and the closing plate is further provided. The fluid tight seal is formed by welding the closing plate to the transformer tank so as to close the opening in the transformer tank.

By welding the closing plate to the transformer tank, a good seal that makes it unnecessary to implement a double barrier at this joint may be provided. Since the closing plate includes the component having a double barrier, assembly of the subsea transformer is facilitated, since the transformer may be sealed inside the transformer tank by a single mounting step (e.g., by welding the closing plate to the transformer tank).

In an embodiment, the transformer tank may be a welded steal tank, and may as such only provide a single barrier against the ambient medium. The closing plate may be a top plate. The closing plate may, for example, be positioned onto an opening arranged on an upper side of the transformer tank (e.g., the closing plate may be placed on top of the transformer tank).

In an embodiment, the fluid tight seal includes a circumferentially continuous weld around the opening. The weld is formed with a flange of the transformer tank surrounding the opening and a peripheral edge of the closing plate. The peripheral edge may be any portion of the closing plate that is adjacent to the contact area between the closing plate and the transformer tank. The fluid tight seal between the transformer tank and the closing plate may thus be provided in an efficient matter.

The fluid tight seal of the opening may further include an O-ring seal located inwards as seen from the welding. Inwards in this respect is towards the inside of the transformer tank. The additional O-ring seal may be useful during the assembly of the subsea transformer or may provide an additional barrier against the ingress of the ambient medium.

In an embodiment, all components of the subsea transformer having a double barrier sealing against the ambient medium are mounted to the closing plate. Accordingly, the transformer tank may not require any further openings or penetrations other than the opening that is closed by the closing plate. The number of weak points in the sealing of the subsea transformer may thus be reduced. Assembly of the subsea transformer may be facilitated, as the top plate with all double barrier sealings may be preassembled and may be mounted to the transformer tank and sealed by the welding. In an embodiment, the transformer tank may not include any further openings other than the opening that is being closed by the closing plate.

In an embodiment, the at least one component mounted to the closing plate includes an electric through connection enabling an electric contacting of the transformer from outside the subsea transformer and/or a pressure compensation device adapted to balance the pressure inside the transformer tank with the pressure of the ambient medium surrounding the subsea transformer when installed subsea. The transformer enclosure, formed by the transformer tank and the closing plate, may, for example, be a pressure compensated enclosure that is filled with a dielectric medium. The pressure of the dielectric medium may be adjusted to the pressure prevailing outside the subsea transformer using the pressure compensation device. The transformer tank may thus be relatively thin walled, resulting in a compact subsea transformer. By providing the electric through connections to the transformer through the closing plate, no penetrations through the transformer tank are necessary for the electric connections.

The at least one component mounted to the closing plate may include a pressure compensation device having a first flexible element providing a fluid tight seal between the ambient medium and an intermediate volume and a second flexible element providing a fluid tight seal between the intermediate volume and the inside of the transformer tank. Using the two flexible elements, a pressure compensation with a double barrier may be provided. If the outer barrier (e.g., the first flexible element) fails and passes sea water, the sea water will only reach the intermediate volume and will not get into the transformer tank and thus into contact with the transformer.

Both the first and the second flexible element may be mounted to an outer side of the closing plate (e.g., a side of the closing plate facing away from the inside of the transformer tank). The second flexible element may be mounted inside a volume enclosed by the first flexible element. The intermediate volume may thus be confined between the first and the second flexible elements and the outer side of the closing plate. A simple but effective configuration for providing a double barrier protection against the ingress of the ambient medium (e.g., sea water) may thus be achieved for the pressure compensation device.

The first and the second flexible elements may, for example, be provided by a first and a second bellow, respectively. The second bellow may be arranged within the first bellow, thus providing the above described configuration.

The pressure compensation device may include a first and a second pressure compensator each including the respective first or second flexible element. The second pressure compensator is mounted to an outer side of the closing plate. The second pressure compensator may enclose a volume with the closing plate, and the closing plate may have a fluid connection between the volume enclosed by the second pressure compensator and the interior of the transformer tank. For example, the closing plate may have a flow channel or a flow tube that provides the fluid connection. If the volume of a medium included in the transformer tank becomes larger or smaller (e.g., due to temperature changes), the medium may flow through the fluid connection into or out of the volume enclosed by the second pressure compensator, thereby keeping the pressure inside the transformer tank constant. The pressure compensator may thus also be termed volume compensator.

In an embodiment, the subsea transformer may include two of the above mentioned pressure compensation devices mounted distant to each other to the closing plate. The subsea transformer may, for example, include two double bellows, with one of the bellows enclosing a volume that is in fluid communication with the interior of the transformer tank and the intermediate volume being enclosed between the two bellows (and possibly the closing plate). Volume changes of the medium in the transformer tank may thus be compensated, while the overall design of the subsea transformer may be kept compact with such arrangement.

The transformer tank and the pressure compensator may be filled with a medium (e.g., with dielectric liquid).

In a further embodiment, the at least one component mounted to the closing plate includes at least one electric through connection enabling an electric contacting of the transformer from outside the subsea transformer. The electric through connection may include a bushing chamber mounted to the closing plate. The bushing chamber has a liquid tight seal to the inside of the transformer tank and to the outside of the subsea transformer. The bushing chamber may include at least one electric connection to the inside of the transformer tank and at least one electric connection to the outside of the subsea transformer. A conductor inside the bushing chamber may electrically couple the two electric connections. The bushing chamber may be mounted to an outer side of the closing plate. Using the bushing chamber, a double barrier for the electric through connection to the transformer may be provided at the closing plate. For example, since both the bushing chamber and a pressure compensation device may be provided on the closing plate, assembly of the subsea transformer is facilitated.

The bushing chamber may be pressure compensated against the intermediate volume of the pressure compensation device. The bushing chamber may enclose a first volume, and the pressure compensation device may enclose a second volume (e.g., different to the first volume). Pressure compensation may be provided between these two different volumes.

As an example, the closing plate may include a fluid connection between the volume enclosed by the bushing chamber and the intermediate volume. For example, a flow channel or flow tube may be provided in the closing plate. As mentioned above, the intermediate volume may be the volume enclosed between a first and a second pressure compensator and the closing plate (e.g., the volume enclosed between two bellows that are placed one within the other and both of which are mounted to the closing plate). The fluid connection may then reach from the intermediate volume to the volume enclosed by the bushing chamber to provide pressure balancing. Other possibilities of providing the pressure balancing, such as providing a movable element or a flexible element in such fluid connection, may be provided.

The electric connection to the inside of the transformer tank may be provided by a transformer bushing. The electric connection to the outside of the subsea transformer may be provided by a penetrator.

In an embodiment, the subsea transformer includes two bushing chambers, one of which provides electric through connections to a primary side of the transformer, and the other of which provides electric through connections to a secondary side of the transformer. Depending on whether the transformer is a step-up or a step-down transformer, the voltage on the secondary side of the transformer may be higher or lower than the voltage supplied to the primary side of the transformer. By providing two bushing chambers, the higher voltage electric through connections may be kept separate from the lower voltage through connections. The configuration of the subsea transformer may thus be simplified, as the bushing chamber including low voltage electric connections does not need to be configured for high voltages. Further, the risk of applying a high voltage to a low voltage connection in case of a failure may be reduced.

The transformer tank may be shaped so as to accommodate the transformer and to minimize the overall volume of the transformer tank (e.g., the transformer tank may be adapted to the size of the particular transformer). The transformer tank may have a bottom plate and side walls extending orthogonally to the bottom plate, so that the transformer tank is open at an upper side. At the opening of the transformer tank, a flange that is continuous in circumferential direction of the opening may be provided. The closing plate may be a top plate that is placed on top of the transformer tank for closing the opening. Both in the flange of the transformer tank and the top plate, through holes may be provided for bolting the top plate to the flange of the transformer tank. The fluid tight seal may be provided by welding the edge of the top plate abutting the flange of the transformer tank to the flange of the transformer tank.

The transformer tank may be provided with cooling ribs. For example, the transformer tank may have elongated projections on inner walls of the transformer tank, and/or the transformer tank may have elongate projections on the outer walls of the transformer tank. When the transformer tank is filled with a dielectric liquid, heat produced by the transformer may be transported efficiently through the wall of the transformer tank and from there into the ambient medium (e.g., sea water). As an example, the elongate projections may be cooling ribs extending from a bottom plate of the transformer tank to the top plate mounted to the transformer tank.

The transformer tank, the pressure compensation device and/or the bushing chamber may be filled with dielectric liquid.

The features of the embodiments mentioned above and those yet to be explained below may be combined with each other unless noted to the contrary.

BRIEF DESCRIPTION OF THE DRAWINGS

In the drawings, like reference numerals refer to like elements.

DETAILED DESCRIPTION

Figure 1:
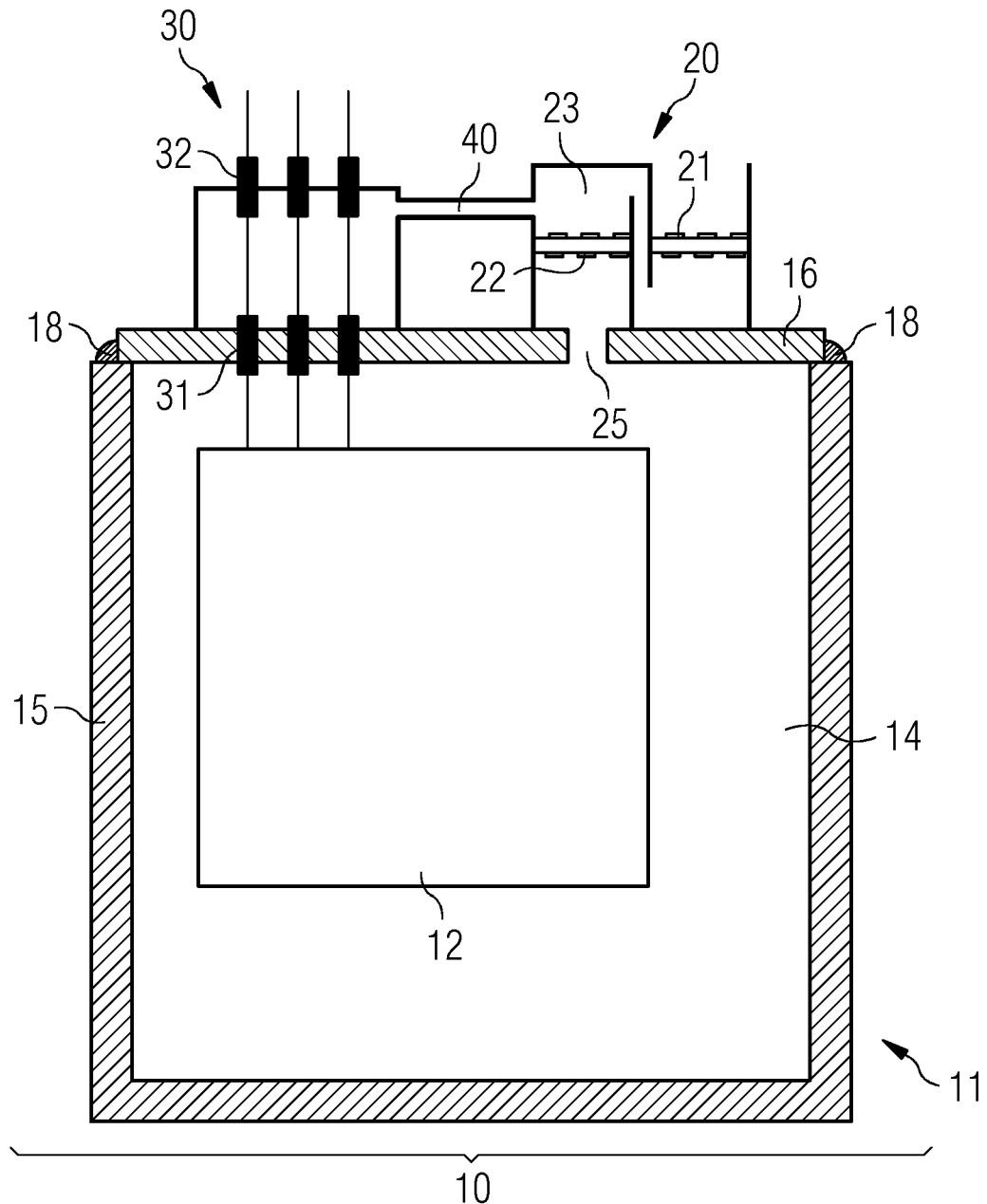
FIG. 1 shows one embodiment of a subsea transformer.

In the following, the embodiments illustrated in the accompanying drawings are described in more detail. The following description is only illustrative and non restrictive. The drawings are only schematic representations, and elements in the drawings are not necessarily to scale with each other.

FIG. 1 illustrates one embodiment of a subsea transformer 10 including a subsea transformer enclosure 11 and a transformer 12 arranged in a transformer chamber 14 of the subsea transformer enclosure 11. The subsea transformer enclosure 11 includes a transformer tank 15 that defines the transformer chamber 14 and has an opening at an upper side. The opening is closed by a closing plate 16. A first component 20 and a second component 30 are mounted to the closing plate 16. Each component of the first component 20 and the second component 30 have a double barrier against ingress of sea water surrounding the subsea transformer 10 when the subsea transformer 10 is installed subsea.

The transformer 12 may, for example, be a step down transformer that transforms a higher voltage supplied from a topside installation (e.g., a marine vessel or an onshore location) by an umbilical or a subsea cable into a lower voltage that is then supplied to components of the subsea installation of which the subsea transformer 10 forms part. In other configurations, the subsea transformer may be used to combine electric energy collected from different offshore energy generating devices (e.g., wind turbines) and may transform the electric energy to a voltage suitable for transmission over a subsea cable to an onshore site or via an umbilical to a topside installation.

As an example, the transformer 12 that is housed in the subsea transformer enclosure 11 may be adapted to convert the subsea cable step out transmission voltage to the subsea switch gear distribution voltage.

Subsea transformer 10 and thus subsea transformer enclosure 11 are adapted to be deployed and operated at depth of water of more than 1000, more than 2000 or even more than 3000 meters. For example, the subsea transformer enclosure 11 (e.g., the transformer tank 15 and the closing plate 16) may be adapted to be operable in a depth range of 1000 to 3000 meters.

For this purpose, the transformer chamber 14 is filled with dielectric liquid. The dielectric liquid provides electric isolation and transports heat from transformer 12 to the walls of the subsea transformer enclosure 11.

The component 20 mounted to transformer chamber 14 is a pressure compensation device. The pressure compensation device 20 includes a first flexible element 21 realizing a first pressure compensator and a second flexible element 22 realizing a second pressure compensator. An intermediate volume 23 is bordered or confined by the first pressure compensator and the second pressure compensator. The intermediate volume 23 is also filled with dielectric liquid.

The flexible elements 21, 22 are in FIG. 1 schematically indicated by the dashed lines. The flexible element of each pressure compensator provides a pressure balancing (e.g., a pressure equalization between the media that the flexible element borders). The flexible element may, for example, be a membrane, a bladder, a bellow or the like.

The first pressure compensator provides pressure balancing between the ambient medium (e.g., sea water) surrounding the subsea transformer 10 and the intermediate volume 23. The second pressure compensator provides pressure balancing between the intermediate volume 23 and the inside of transformer chamber 14, which is in fluid communication with the second pressure compensator 22 via the fluid connection 25 (e.g., an opening in the closing plate 16). The first flexible element 21 provides a fluid tight seal between the ambient medium and the intermediate volume 23, and the second flexible element 22 provides a fluid tight seal between the intermediate volume 23 and the inside of the transformer chamber 14.

Filling the intermediate volume 23 and the transformer chamber 14 with dielectric liquid has the advantage that if the pressure outside the subsea transformer enclosure 11 is increased, only small volume changes of the dielectric liquid confined in the transformer chamber 14 or in the intermediate volume 23 result. The flexible elements of the pressure compensators transmit the increased outside pressure to the intermediate volume 23 and to the transformer chamber 14, respectively, as the flexible elements 21, 22 may be deformed and may thus compensate for volume changes. The pressure compensators may thus also be termed volume compensators. If the transformer chamber 14 was filled with a gas, an increase of the ambient pressure by a factor of 2 would lead to a volume reduction of factor 2, which is difficult to compensate for by a pressure compensator.

The pressure compensators 21, 22 also compensate for changes of a volume of the dielectric liquid that may be caused by temperature changes. This may be of importance during transport of the subsea transformer 10. Without the flexible element of the respective pressure compensator, a change in temperature would lead to a change of volume, which may result in a drastic increase in pressure inside the transformer chamber 14 (e.g., if the dielectric liquid expands). Using the flexible element of the pressure compensator, such volume expansion or reduction may be allowed, while keeping the pressure inside the transformer chamber 14 balanced to the outside pressure.

"Pressure balance" does not necessarily provide that the pressure inside the transformer chamber 14 and the pressure outside the subsea transformer enclosure 11 are exactly the same. A small pressure difference may be maintained, for example, by biasing preloading the flexible element 21 and/or 22 of the pressure compensation device. This is advantageous as, for example, if a small overpressure is maintained in transformer chamber 14, the ingress of, for example, sea water from the surroundings of the subsea transformer enclosure 11 may be prevented, as dielectric liquid will flow out through the leak due to the overpressure. A biasing may, for example, be achieved by making use of a weight placed on top of a bellow by biasing a bellow using a spring, by biasing a membrane or the like.

Pressure compensators 21, 22 thus compensate for volume changes that would otherwise result in pressure imbalances between the inside of transformer chamber 14 and the outside of subsea transformer 10.

Providing the pressure compensation device 20 enables the use of a transformer tank 15 having relatively thin walls.

Although due to the pressure balancing, the pressure difference between the medium inside transformer chamber 14 and outside of the subsea transformer 10 is relatively small, a reliable sealing of the transformer chamber 14 still is to be provided (e.g., in view of the long service life that is required for a subsea transformer). In the embodiment of FIG. 1, a fluid tight seal 18 is thus provided between the transformer tank 15 and the closing plate 16. The fluid tight seal 18 is formed by welding the closing plate 16 to the transformer tank 15, so that the opening on the upper side of transformer tank 15 is closed.

The sectional side view of FIG. 1 only schematically illustrates that a peripheral edge of the closing plate 16 is welded to an upper part of the transformer tank 15 that surrounds the opening. The implementation of the fluid tight seal 18 (e.g., the position at which the closing plate 16 is welded to transformer tank 15) may be different from the schematic illustration of FIG. 1 and will be chosen in accordance with the particular layout of subsea transformer 10. As an example, the closing plate 16 may have a flange or a protrusion that extends outward or downward and may be welded to an upper rim of the transformer tank 15, or the transformer tank 15 may be provided with a flange surrounding the opening, towards which the closing plate 16 is welded (e.g., see FIG. 2).

By providing the fluid tight seal 18 in form of a circumferentially continuous weld around the opening in the transformer tank, a very good sealing may be achieved so that the fluid tight seal 18 may be the only barrier against the ingress of sea water (e.g., so that only a single barrier is required at the joint between the closing plate 16 and the transformer tank 15). Even so, an additional seal may be provided, which may, for example, be beneficial during the assembly of the subsea transformer enclosure 11 (e.g., for providing a preliminary sealing when dielectric liquid is filled into the transformer chamber 14).

For electrically contacting transformer 12, electric through connections that reach from outside the subsea transformer 10 into the transformer chamber 14 are provided. The electric through connections are implemented by a bushing chamber 30 mounted to the closing plate (or top plate) 16, electric connections 31 from the bushing chamber 30 to the inside of transformer chamber 14 and electric connections 32 from the bushing chamber 30 to the outside of the subsea transformer 10. Electric connections 32 penetrate an outer wall of the bushing chamber 30 while electric connections 31 penetrate the closing plate 16. Bushing chamber 30 may be welded to the closing plate 16, and may be filled with a dielectric liquid. Reference numeral 34 indicates a sealing element that may be provided by a flange including a gasket, such as an O-ring or the like, and/or by welding. By such implementation of the electric through connections for contacting the transformer 12, a reliable double barrier sealing may be achieved. Water entering the bushing chamber 30 in case of a failure will not reach the transformer chamber 14.

Similarly, the connections between a wall of one of the pressure compensators and the transformer chamber 14 may be welded. Sealings are provided at the mounting positions of the flexible elements 21, 22. The first flexible element 21 provides a first seal against the ambient medium, while the second flexible element 22 provides a second seal between the intermediate volume and the transformer chamber 14, so that transformer chamber 14 is protected by a double barrier against ambient sea water. Similarly, the sealings of the electric connections 32 provide a first barrier, and the sealings of the electric connections 31 provide a second barrier for the transformer chamber 14. The configuration illustrated in FIG. 1 thus achieves a double barrier sealing for the transformer chamber 14, while only using a simple pressure compensator arrangement.

As shown, all components 20, 30 that require some type of access into transformer chamber 14 (e.g., for the electrical connections or for pressure balancing) are provided with double barriers and are mounted to the closing plate 16. Accordingly, no further openings or feed-through connections are provided in the transformer tank 15 (e.g., other than the opening that is closed by closing plate 16). Transformer tank 15 may thus have a relatively simple configuration. The transformer tank 15 may be a welded steel tank including a bottom plate and side walls. Since all joints of transformer tank 15 are welded, the single barrier formed by transformer tank 15 provides sufficient protection against the ingress of sea water, even when subsea transformer 10 is deployed at great depths.

Since the components having double barriers are mounted to the closing plate 16, and may thus be preassembled, the assembly of subsea transformer 10 is facilitated. Assembly may be performed by placing transformer 12 into the transformer tank 15, electrically contacting the transformer 12 (e.g., using electric connections 31), placing the closing plate 16 on the transformer tank 15 and providing the fluid tight seal 18 by welding the closing plate 16 to transformer tank 15. Dielectric liquid may be filled into the transformer chamber 14 before closing transformer tank 15.

When installed subsea, a sea cable (or umbilical) connection may be terminated at the electrical connections 32. For example, a jumper cable may be connected to electric connections 32 and may on an other side be connected to an umbilical termination assembly (UTA). The umbilical termination assembly may terminate an umbilical that connects to a topside installation located on a vessel or at an onshore site. For a long lifetime, the jumper cable may be connected via dry mate connectors to the electric connections 32. Inside bushing chamber 30, an electric conductor connects the electric connections 31 and 32, which is explained further below in more detail with respect to FIG. 2.

The volume enclosed by bushing chamber 30 is filled with dielectric liquid. The inner volume of bushing chamber 30 is pressure balanced against the intermediate volume 23. In the example of FIG. 1, a fluid connection 40 is provided between the bushing chamber 30 and the intermediate volume 23. Fluid connection 40 enables the dielectric liquid to flow between the bushing chamber 30 and the intermediate volume 23. Thus, using the first pressure compensator 21, the interior of the bushing chamber 30 is pressure balanced against the ambient medium surrounding the subsea transformer 10.

In other embodiments, other ways for pressure balancing between the bushing chamber 30 and the intermediate volume 23 may be provided. As an example, pressure balancing may occur using a movable piston, a flexible element such as a bladder, a membrane, a bellow or the like.

By making use of only two pressure compensators, a double barrier pressure compensation for the inside of transformer chamber 14 is achieved, and a pressure compensation for the inside of bushing chamber 30 is achieved.

The arrangement of the pressure compensators 21, 22 is only schematically illustrated in FIG. 1, so that the general function and purpose of the pressure compensation device 20 becomes clear. As mentioned above, the pressure compensators 21, 22 may be configured in a variety of different ways. The pressure compensators 21, 22 may be arranged distant to one another, or one within the other, and may include different ways for pressure compensation.

Figure 2:
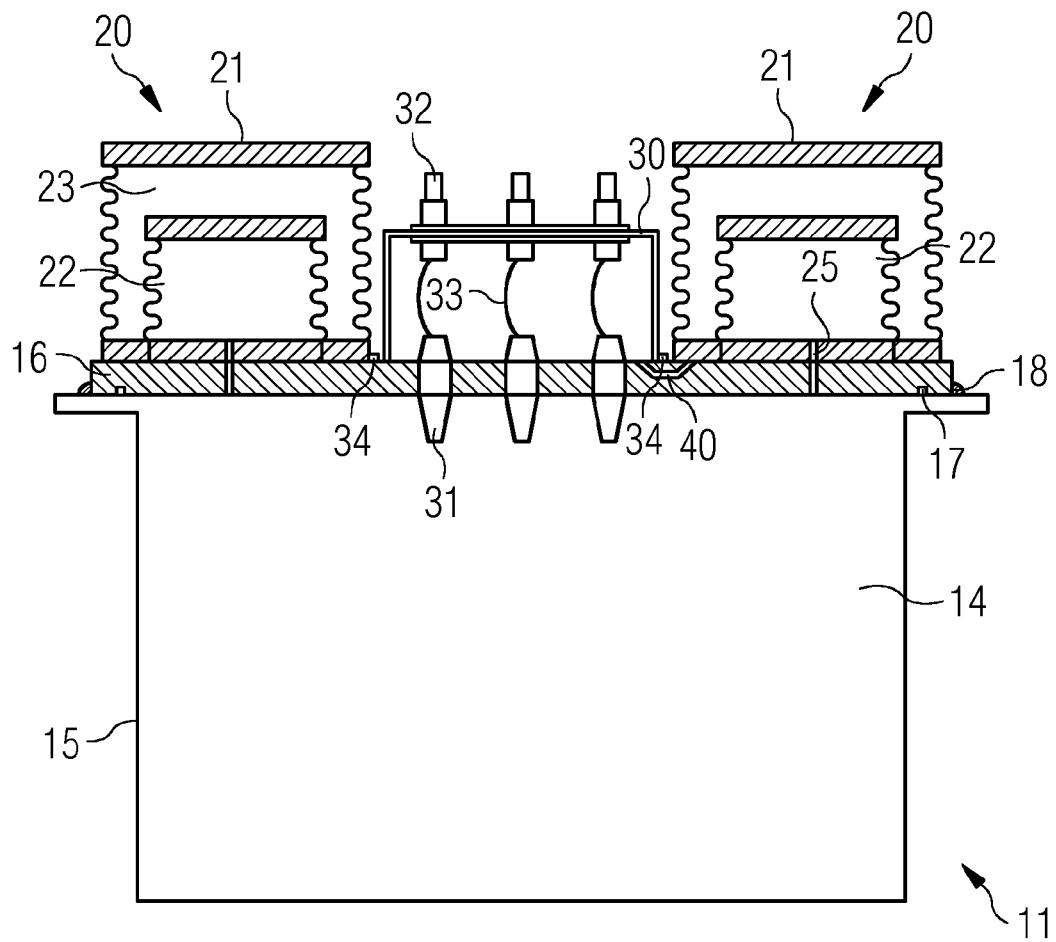
FIG. 2 is a sectional side view of one embodiment of a subsea transformer.

FIG. 2 shows an implementation of the subsea transformer 10 described above with respect to FIG. 1. Accordingly, the explanations given above are similarly applicable to the subsea transformer 10 of FIG. 2 and described hereinafter.

In the example of FIG. 2, the transformer tank 15 includes a flange portion at an upper rim that extends radially outwards. The flange portion abuts the closing plate 16, and the fluid tight seal 18 is provided by a weld between the flange portion and the outer peripheral edge of the closing plate 16. Further, the joint between closing plate 16 and transformer tank 15 includes an additional seal 17 located inwards with respect to the fluid tight seal 18. The additional seal 17 is implemented as an O-ring seal, in which a resilient sealing ring is disposed in a recess in the closing plate 16 and is compressed between the closing plate 16 and the flange portion. The additional seal 17 may be beneficial when mounting the closing plate 16 to the transformer tank 15 (e.g., for providing a preliminary sealing of the transformer chamber 14).

Figure 3:
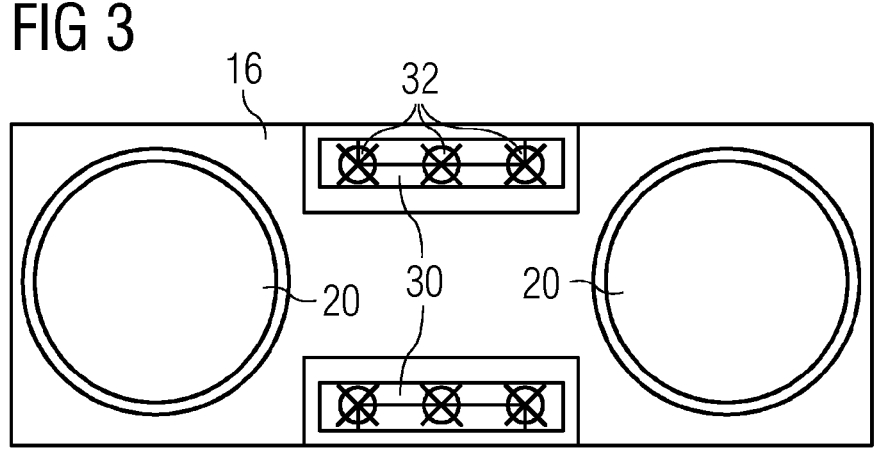
FIG. 3 is a top view of the subsea transformer of FIG. 2.
Figure 4:
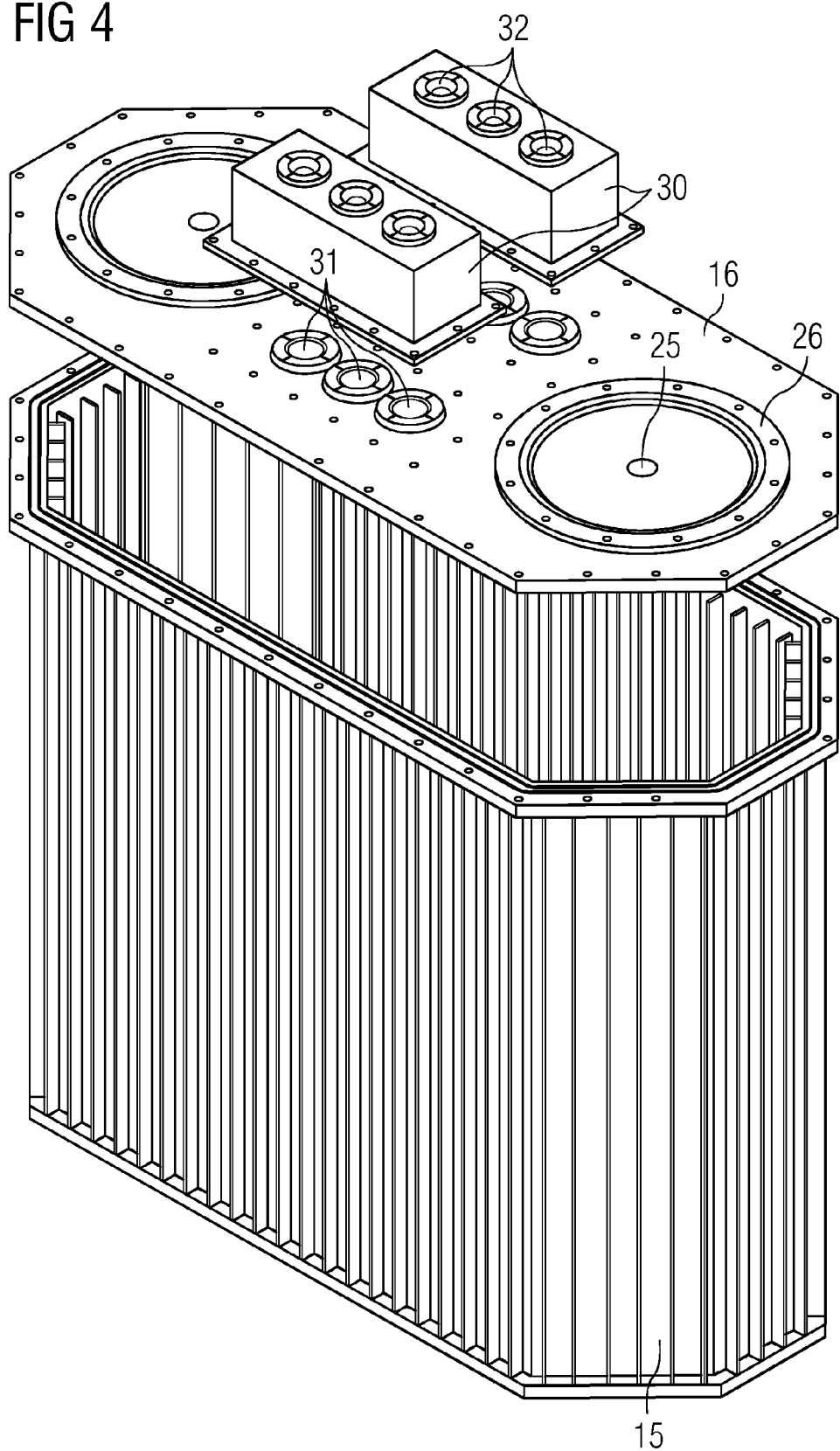
FIG. 4 is a perspective view of the subsea transformer of FIGS. 2 and 3.

The transformer tank 15 is again provided by a single completely welded wall that is adapted to effectively transport the heat losses of the transformer to the ambient sea water. The closing plate 16 may be a steel plate. For the purpose of a comprehensive presentation, only the subsea transformer enclosure 11 is shown in FIGS. 2-4, although in an assembled state, a transformer 12 will be located in the transformer chamber 14 and be contacted via the electric connections 31.

In the example of FIG. 2, the pressure compensation device 20 includes flexible elements 21, 22 (e.g., a first flexible element 21 and a second flexible element 22) in form of two bellows (e.g., a first bellow and a second bellow). The second bellow is placed within the first bellow. The intermediate volume 23 is thus confined between the two bellows 21, 22. The fluid connection 40 between the interior of the bushing chamber 30 and the intermediate volume 23 is provided by a flow channel. These "compensation tubes" allow the dielectric liquid to flow between the intermediate volume 23 and the inside of the bushing chamber 30. Fluid connection 25 between the interior of the second bellow 22 and the inside of transformer chamber 14 is similarly provided by a compensation tube.

For the purpose of redundancy and for achieving a compact configuration, a first pressure compensation device 20 and a second pressure compensation device 20 are mounted to the closing plate 16, each having two bellows 21, 22, one placed within the other. If one pressure compensation device 20 fails, the other may still provide pressure compensation. Further, each pressure compensation device may be smaller than one large volume pressure compensation device, making each pressure compensation device less prone to damage.

The external electric power connections from and to the transformer (e.g., to the primary and secondary side of the transformer) are grouped into two separate dielectric liquid filled bushing chambers 30. In the side view of FIG. 2, only one bushing chamber 30 is visible. The second bushing chamber is shown in FIG. 3, showing a top view of the subsea transformer enclosure 11 of FIG. 2.

The bushing chamber 30 is provided in form of a bushing box. The bushing box acts as a double barrier to the ambient sea water, as seen from the inside of transformer chamber 14. The electric connections 31 to the inside of the transformer chamber 14 are provided in form of transformer bushings. The transformer bushings penetrate the lower wall of the bushing box 30 (e.g., the closing plate 16) and provide an electric through connection for an electric conductor (not shown in FIG. 2; see FIGS. 5 and 6).

The electric connections 32 to the outside of the subsea transformer enclosure 11 are provided by penetrators, which may be high voltage penetrators, and which may attach to a jumper cable using dry mate connectors.

In other configurations, the penetrators may be medium voltage penetrators. A high voltage may be a voltage in a range between about 50 kV and about 200 kV. A medium voltage may be a voltage in a range between about 1,000 V and about 50 kV. On the primary side of the transformer, high voltage penetrators may be used, while on the secondary side, medium voltage penetrators may be used.

An electric conductor 33 is provided between the transformer bushings 31 and the penetrator 32. The conductor 33 and/or the transformer bushing 31 and/or the penetrator 32 may be provided with boot seals. In case of leakage of sea water into the bushing box 30, the boot seals may provide protection from water. This may prevent that a flashover occurs in the case of water leakage into the bushing box. The boot seals prevent the water from coming into contact with the conductors.

Another possibility to improve the protection of the electric connections from sea water is the use of double barriers in each penetration of a wall of bushing chamber 30. This is illustrated in FIGS. 5 and 6.

Figure 5:
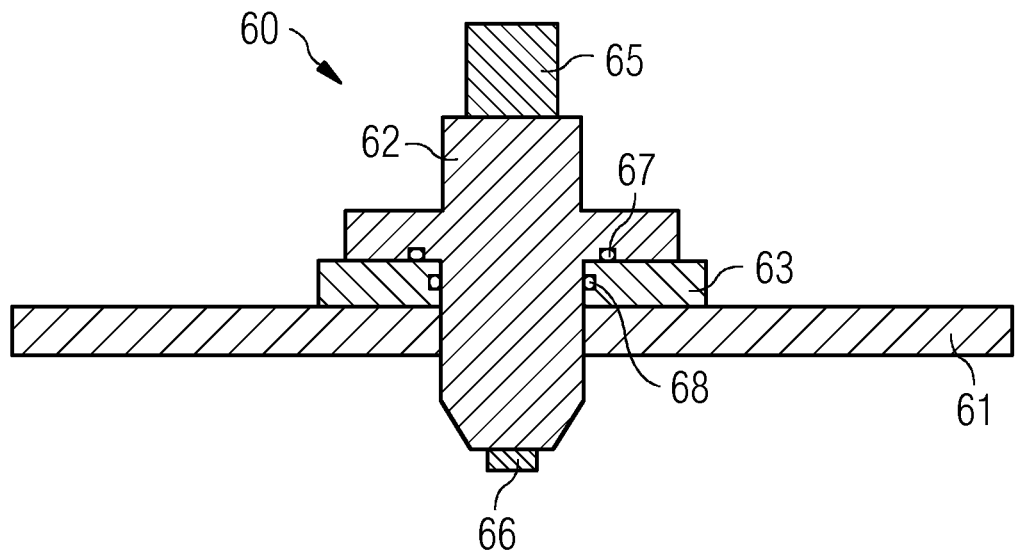
FIG. 5 is a sectional side view illustrating the sealing of a penetrator to a wall of the bushing chamber in accordance with an embodiment.

In the example of FIG. 5, the penetrator 62 is provided with an axial sealing 68 and a radial sealing 67. The wall 61 of the bushing chamber includes a penetrator adaptation 63, against which the penetrator 62 is sealed. The seals 67, 68 may, for example, be provided in form of O-rings. Reference numeral 65 designates the electric connection towards the sea cable, or towards the conductor 33 in the bushing chamber, while reference numeral 66 designates the electric connection to the inside of the bushing chamber, or to the inside of the transformer housing, respectively. Each of the electric connections 31, 32 may be configured similarly to the electric connection 60 shown in FIG. 5. Penetrator 62 may be made of a resin or a plastic material and provides electric isolation between the wall 61 of the bushing chamber and the electric conductor (indicated by reference numerals 69 and 66) in the penetrator 62.

Figure 6:
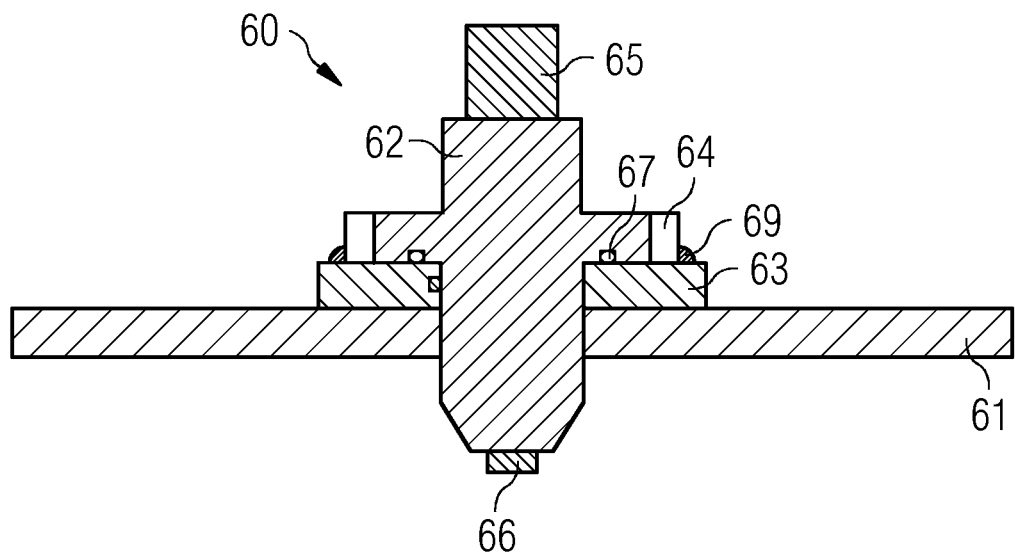
FIG. 6 is a sectional side view of the sealing of a penetrator to a wall of the bushing chamber in accordance with another embodiment.

FIG. 6 illustrates another possibility of implementing the electric connections 31, 32 with a double barrier. In the configuration of FIG. 6, the electric connection 60 includes a radial sealing 67 in form of an O-ring. A radial edge 64 of the penetrator 62 is metalized. The metalized penetrator edge 64 is welded to the penetrator adaptation 63 (indicated by reference numeral 69). This configuration provides a liquid tight seal and a double barrier. Again, the configuration of FIG. 6 may be used in any of the electric connections 31, 32.

FIG. 3 shows a top view of one embodiment of the subsea transformer enclosure 11 of FIG. 2. The two pressure compensation devices 20 are mounted to the closing plate 16. The two bushing boxes 30, with the electric connections 32 towards which a sea cable or umbilical may be connected, are shown. From each bushing chamber 30, a fluid connection may be provided to the intermediate volume of either one of the pressure compensation devices 20, or to the intermediate volume of both pressure compensation devices 20. In one embodiment, a fluid connection from one bushing chamber 30 to one pressure compensation device 20 may be provided, and a fluid connection from the other bushing chamber 30 to the other pressure compensation device 20 may be provided. If water enters one of the bushing chambers or pressure compensation devices, the others will remain unaffected. On the other hand, if connections to both pressure compensation devices 20 are provided, pressure compensation continues even if one of the pressure compensation devices fails.

FIG. 4 shows a perspective view of one embodiment of the subsea transformer enclosure 11 of FIGS. 2 and 3. The transformer tank 15 is provided with cooling ribs inside and outside to provide that heat losses of the transformer are effectively transported to the sea water. The transformer tank 15 may be relatively thin walled, as the differential pressure between inside the transformer chamber 14 and the surrounding medium is kept minimal due to the pressure compensation. As mentioned above, an internal overpressure may result from biasing preloading the pressure compensators, and the transformer tank 15 is to be constructed to withstand the maximum internal overpressure. The overpressure provides that an accidental leakage in a system will not result in any water inside the transformer chamber. The dielectric liquid will, to a limit, leak out into the sea water. This way, a leakage may be detected before a large failure occurs, like a short circuit inside the transformer.

As shown, the closing plate 16 includes the fluid connections 25 between the transformer chamber and the pressure compensation device 20 (e.g., the inside of the second bellow 22). Reference numeral 26 indicates the mounting position of the double bellow pressure compensation device. Bushing boxes 30 have a flange, by which the bushing boxes 30 are mounted to the closing plate 16. The bushing box may be welded to the closing plate 16.

The transformer tank 15 may be shaped so that the volume of dielectric liquid may be kept to a minimum (e.g., the shape may be adapted to the shape of the transformer that the transformer tank 15 houses). The transformer tank 15 and the top plate 16 may be made of carbon steel. The pressure compensation devices may be made of stainless steel, or a comparable material, such as Inconel® 625.

In the example of FIG. 4, the flange at the upper end of the transformer tank 15 and the peripheral edge of closing plate 16 are provided with mating through holes. The mating through holes may be used to initially bolt the closing plate 16 to transformer tank 15 before the fluid tight seal 18 is provided by welding.

The above outlined configurations provide a subsea transformer that is easy to assemble and in which the sealing against ambient sea water is improved. A closing plate, on which components requiring a penetration into the transformer chamber are mounted, is provided, resulting in a simplified assembly. As the closing plate is welded to the transformer tank, there is no need for a double barrier at this joint. A secure sealing having a long operating life may thus be achieved for the subsea transformer.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:
1. A subsea transformer comprising:
a transformer;
a transformer tank configured to accommodate the transformer, the transformer tank having an opening sized so as to enable insertion of the transformer into the transformer tank through the opening, the transformer being arranged in the transformer tank;
a closing plate configured to close the opening of the transformer tank;
at least a first component and a second component mounted to the closing plate, the first component comprising a pressure compensation device, the pressure compensation device comprising a double barrier against ingress of an ambient medium surrounding the subsea transformer when installed subsea, the double barrier comprising a first flexible element providing a fluid tight seal between the ambient medium and an intermediate volume, and a second flexible element providing a fluid tight seal between the intermediate volume and the inside of the transformer tank, the second component comprising at least one electric through connection enabling an electric contacting of the transformer from outside the subsea transformer, the electric through connection comprising a bushing chamber mounted to the closing plate, the bushing chamber having a liquid tight seal to the inside of the transformer tank and to the outside of the subsea transformer, the bushing chamber comprising at least one electric connection to the inside of the transformer tank and at least one electric connection to the outside of the subsea transformer; and a fluid tight seal between the transformer tank and the closing plate, the fluid tight seal being formed by welding the closing plate to the transformer tank so as to close the opening in the transformer tank, wherein the bushing chamber is pressure compensated against the intermediate volume.

2. The subsea transformer of claim 1, wherein the fluid tight seal comprises a circumferentially continuous weld around the opening, the circumferentially continuous weld being formed with a flange of the transformer tank surrounding the opening and a peripheral edge of the closing plate.

3. The subsea transformer of claim 1, wherein the sealing of the closing plate and the transformer tank further comprises an O-ring seal located inwards as seen from the welding of the fluid tight seal.

4. The subsea transformer of claim 1, wherein the pressure compensation device is configured to balance pressure inside the transformer tank with pressure of the ambient medium surrounding the subsea transformer when installed subsea.

5. The subsea transformer of claim 1, wherein the first flexible element is mounted to an outer side of the closing plate, the second flexible element being mounted to an outer side of the closing plate and inside a volume enclosed by the first flexible element.

6. The subsea transformer of claim 1, wherein the first flexible element and the second flexible element are provided by a first bellow and a second bellow, respectively, the second bellow being arranged within the first bellow.

7. The subsea transformer of claim 1, wherein the pressure compensation device comprises a first pressure compensator and a second pressure compensator, each pressure compensator of the first pressure compensator and the second pressure compensator comprising the respective first flexible element or second flexible element, the second pressure compensator being mounted to an outer side of the closing plate, the second pressure compensator enclosing a volume, the closing plate having a fluid connection between the volume enclosed by the second pressure compensator and the interior of the transformer tank.

8. The subsea transformer of claim 1, wherein the pressure compensation device is a first pressure compensation device, and wherein the subsea transformer further comprises a second pressure compensation device, the first pressure compensation device and the second pressure compensation device being mounted distant to each other to the closing plate.

9. The subsea transformer of claim 1, wherein the closing plate comprises a fluid connection between the volume enclosed by the bushing chamber and the intermediate volume.

10. The subsea transformer of claim 8, wherein the electric connection to the inside of the transformer tank is provided by a transformer bushing, the electric connection to the outside of the subsea transformer is provided by a penetrator, or the electric connection to the inside of the transformer tank is provided by the transformer bushing and the electric connection to the outside of the subsea transformer is provided by the penetrator.

11. The subsea transformer claim 8, wherein the bushing chamber is a first bushing chamber, and wherein the subsea transformer further comprises a second bushing chamber, one bushing chamber of the first bushing chamber and the second bushing chamber providing electric through connections to a primary side of the transformer, the other bushing chamber of the first bushing chamber and the second bushing chamber providing electric through connections to a secondary side of the transformer.

12. The subsea transformer of claim 9, wherein the fluid connection comprises a flow channel.

13. The subsea transformer of claim 2, wherein the sealing of the closing plate and the transformer tank further comprises an O-ring seal located inwards as seen from the welding of the fluid tight seal.

14. The subsea transformer of claim 2, wherein the pressure compensation device is configured to balance pressure inside the transformer tank with pressure of the ambient medium surrounding the subsea transformer when installed subsea.

* * * * *